J. H. BEAUREGARD & J. WROATH.
Cover for Pots and Kettles.
No. 197,591  Patented Nov. 27, 1877.
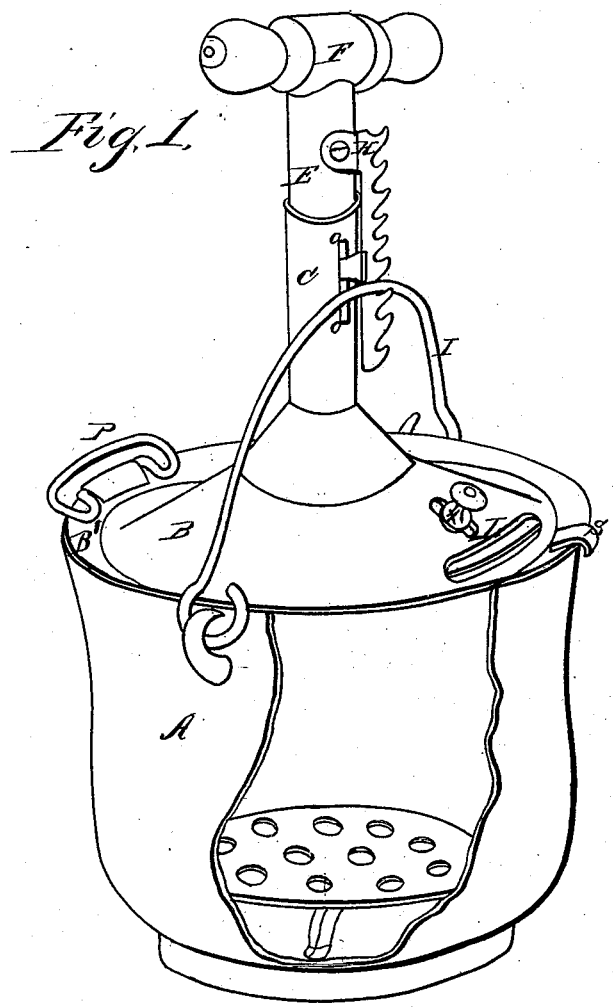
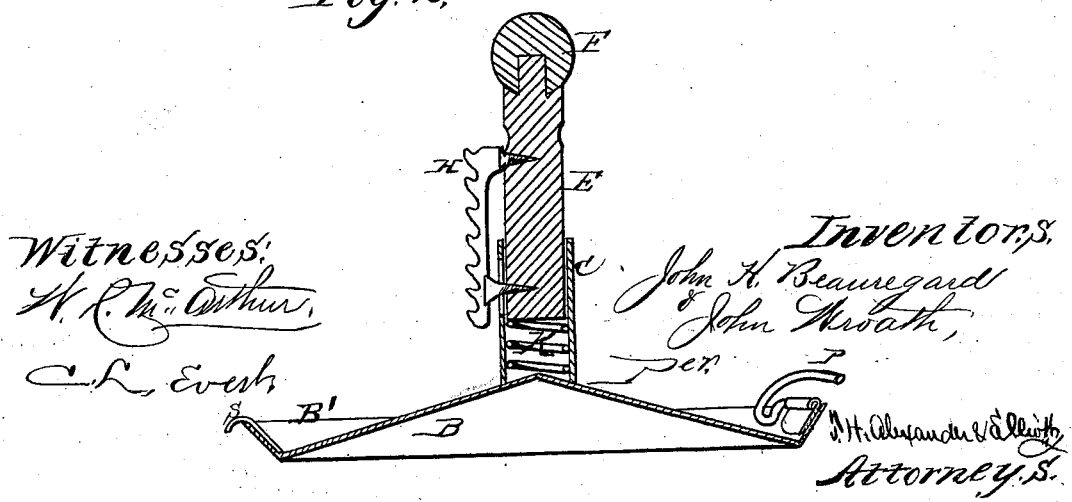

UNITED STATES PATENT OFFICE.

JOHN H. BEAUREGARD AND JOHN WROATH, OF SANDY HILL, NEW YORK, ASSIGNORS OF ONE-THIRD THEIR RIGHT TO JAMES McCARTY, OF SAME PLACE.

IMPROVEMENT IN COVERS FOR POTS AND KETTLES.

Specification forming part of Letters Patent No. 197,591, dated November 27, 1877; application filed October 16, 1877.

*To all whom it may concern:*

Be it known that we, JOHN H. BEAUREGARD and JOHN WROATH, of Sandy Hill, in the county of Washington and State of New York, have invented certain new and useful Improvements in Covers for Pots and Kettles; and we do hereby declare that the following is a full, clear, and exact description thereof, reference being had to the accompanying drawings, and to the letters of reference marked thereon, which form part of this specification.

The nature of our invention consists in the construction and arrangement of a cover for pots and kettles; and it has for its object to provide a means for holding a cover firmly in position when placed upon a pot or kettle.

Our invention also has for its object the almost absolute confining of steam in a kettle by securing a downward pressure on the cover from the bail of the kettle, which, when provided with basket or ordinary false bottom, converts any ordinary kettle into a steamer. The object is also to keep the bail in a vertical position above the kettle, and to provide a suitable handle, of wood or other cool material, for moving the kettle about, or tipping up the same for the purpose of draining off water or other liquid, and at the same time to secure the cover against moving when the kettle is tipped to one side.

It is also designed to provide for drawing off water or other hot liquid without moving the cover or annoying the operator with steam, or requiring him to use a holder.

It is still further designed to provide a single cover for different-sized kettles by having the outer rim of the cover in the shape of a section of the surface of an inverted cone.

In order to enable others skilled in the art to which our invention appertains to make and use the same, we will now proceed to describe its construction and operation, referring to the annexed drawing, in which—

Figure 1 is a perspective view of a kettle with our cover attached, and Fig. 2 is a vertical section of our improved cover.

A represents an ordinary kettle. B is the body or principal part of the kettle-cover. C is an upright tube or socket on the center of the cover to receive the stem E, to which the handle F is attached. H is a ratchet secured to the side of the stem E, to hold the bail I of the kettle in nearly a vertical position, by which the cover is held down firmly upon the kettle. The cover B is provided with a flaring rim, B′, around its circumference. S is a small lip attached to the outer edge of the cover, to prevent its slipping back and up when the kettle is tipped forward toward the valve or gate L. K is a spiral spring placed in the lower part of the socket C and against the lower end of the stem E. When the handle is pressed downward for the purpose of latching the bail, the spring K then operates to force the ratchet H up against the bail, which at the same time forces the cover downward against the kettle. L is a slide-valve or gate near the outer edge of the cover. This gate is readily opened by means of the button X. O is a slot in the socket C, through which a screw or pin is inserted into the stem E, to prevent it from flying out of the socket by the force of the spring. P is a handle, which may be made of wire or other material, and attached to the opposite side of the cover B from the valve L. The handle F is made of wood in order to be kept cool, but may be made of any other material.

When the cover B B′ is placed upon a kettle and the bail I is swung up to the face of the ratchet H, the stem E, with the ratchet, is forced downward by pressure upon the handle F, against the spring K, until the bail I drops into one of the teeth of the ratchet. Then, when the pressure of the hand is removed, the force of the spring K forces the cover B B′ down firmly against the kettle, and at the same time the ratchet H rigidly up against the bail I, thus securing at one motion a close-fitting cover, and a rigid bail connected with the stem E of the handle F, thereby enabling the operator or cook to have perfect and easy control of a kettle in moving it about, or in draining off water or other hot liquid without using a holder. When it is desired to remove the liquid from vegetables or other material, the gate L is opened by forcing the knob X to one side. By forcing the stem E down against the spring K the bail of the kettle is released and the cover easily removed.

It is evident that in lieu of a spiral spring, K, a rubber or other spring may be used for the same purpose.

Having thus fully described our invention, what we claim as new, and desire to secure by Letters Patent, is—

1. In combination with a kettle and its bail and removable cover, an adjustable spring-connection attached to the cover, and adapted, in the manner described, to be interposed between the bail and the cover, for the purpose of securing the cover firmly against the top of the kettle, as set forth.

2. The handle F, attached to the cover B, and provided with a mechanism, substantially as described, whereby the bail of the kettle is compelled to hold the cover down against the kettle, substantially as herein set forth.

3. The combination of the cover B, socket C, spring K, handle F, stem E, and ratchet H, to be used in connection with a pot or kettle and its bail, substantially as and for the purposes herein set forth.

In testimony that we claim the foregoing as our own we affix our signatures in presence of two witnesses.

J. H. BEAUREGARD.
JOHN WROATH.

Witnesses:
    EDWARD O'BRIEN, Jr.,
    JAS. McCARTY.